United States Patent [19]
Külling

[11] Patent Number: 4,740,390
[45] Date of Patent: Apr. 26, 1988

[54] GRANULE PRODUCING AND/OR PROCESSING APPARATUS AND METHOD

[75] Inventor: Walter Külling, Bubendorf, Switzerland

[73] Assignee: Aeromatic AG, Bubendorf, Switzerland

[21] Appl. No.: 946,375

[22] Filed: Dec. 24, 1986

[30] Foreign Application Priority Data

Dec. 30, 1985 [CH] Switzerland ............... 05550/85

[51] Int. Cl.⁴ ............................................. B05D 1/02
[52] U.S. Cl. .................................. 427/213; 427/240; 118/303; 118/DIG. 5
[58] Field of Search ............... 427/213, 240; 118/303, 118/DIG. 5; 241/57, 282.1; 366/107

[56] References Cited

U.S. PATENT DOCUMENTS

| | | | |
|---|---|---|---|
| 3,097,958 | 7/1963 | Morris | 118/303 X |
| 3,179,378 | 4/1965 | Zenz et al. | 118/DIG. 5 |
| 4,117,801 | 10/1978 | Dannelly et al. | 118/303 X |
| 4,237,814 | 12/1980 | Ormos et al. | 118/308 |
| 4,535,006 | 8/1985 | Naunapper | 427/213 |
| 4,542,043 | 9/1985 | Abe | 118/303 |
| 4,556,175 | 12/1985 | Motoyama et al. | 241/282.1 X |

FOREIGN PATENT DOCUMENTS

| | | |
|---|---|---|
| 2738485 | 3/1979 | Fed. Rep. of Germany . |
| 2805397 | 9/1981 | Fed. Rep. of Germany . |
| 1577656 | 6/1969 | France ............... 118/303 |

Primary Examiner—Shrive P. Beck
Attorney, Agent, or Firm—Ralph W. Selitto, Jr.

[57] ABSTRACT

The interior of a rotary-disk apparatus is divided by a generally cylindrical wall into an inner processing zone and an outer processing zone. The inner processing zone can be connected to an disconnected from the outer processing zone by moving the wall into and out of sealing engagement with an underlying rotary disk. When the wall and the disk are not in sealing engagement with each other, a gap is formed which permits the transfer of granules from the inner processing zone to the outer processing zone as a result of the rotation of the disk.

70 Claims, 3 Drawing Sheets

GRANULE PRODUCING AND/OR PROCESSING APPARATUS AND METHOD

FIELD OF THE INVENTION

The present invention relates to an apparatus and method for producing and/or processing granules, and, more particularly, to such an apparatus and method which employ at least two separate processing zones or chambers.

BACKGROUND OF THE INVENTION

For the production and processing of granules, different processes are necessary. An apparatus often used for such processes is the so-called fluid-bed apparatus described, for instance, in DE-09 27 38 485. In such an apparatus, the lower end of the fluid-bed container, which has a sieve bottom, is provided with a horizontal rotor-disk. Beneath the sieve bottom there is a wind chamber. In order to adjust the apparatus to different kinds of granules, the lower part of the container surrounding the rotor-disk can, according to DE-PS 28 05 397, have a conical shape and the rotor-disk can be adjustable in height, whereby the size of a ring-slit provided between the rotor-disk and the surrounding cylindrical wall of the fluid-bed container can be varied to thereby regulate the strength of the air stream.

Apparatus of the kind described above have various disadvantages. For instance, in order to precisely regulate the slit between the container wall and the rotor-disk, the requirements to the container geometry—especially in the lower, conically formed part—are very high. Also, problems arise during the practical usage of such an apparatus. For example, the circulating movement of the solid materials caused by such an apparatus, which is referred to hereafter as the "annular movement", is important for a good mixture and regular processing of the granules. Such annular movement is produced primarily by the centrifugal forces exerted by the rotor-disk on the granules. Should, for instance, the drying performance be increased, then the airstream flowing through the fluid-bed cannot be arbitrarily intensified because when the airstream reaches a certain intensity, the annular movement of the granules is disturbed and proper drying cannot be achieved. Moreover, when a high intensity airstream is used in connection with a coating and drying process, a powder feeding operation or an atomizing operation in accordance with the so-called ultrasonic principle is impeded if not made impossible because the fine dust of the atomizing operation and the liquid mist of the atomizing operation are carried away by the airstream and thus are not at the disposal of the particles which are being coated and dried.

SUMMARY OF THE INVENTION

The problems and disadvantages of the prior art discussed above are overcome in accordance with the present invention by dividing the interior of a rotary-disk apparatus into an inner processing zone and an outer processing zone and then selectively connecting and disconnecting the inner and outer processing zones to and from each other. When the inner and outer processing zones are connected to each other, centrifugal forces resulting from the rotation of a rotary disk mounted within the apparatus cause the granules to be conveyed from the inner processing zone to the outer processing zone. The granules conveyed to the outer processing zone can be subjected to one processing operation, while the granules remaining in the inner processing zone are subjected to another processing operation. For instance, by directing an upward airflow into the outer processing zone, the granules contained in the outer processing zone can be fluidized to thereby promote their drying, while the granules contained in the inner processing zone are simultaneously subjected to a granulating or coating operation.

In one embodiment of the present invention, the inner and outer processing zones are separated from each other by a generally cylindrical wall. The inner and outer processing zones are connected and disconnected by moving the wall and the disk into and out of sealing engagement with each other, the gap formed when the wall and the disk are not in sealing engagement allowing the granules to be conveyed from the inner processing zone to the outer processing zone.

By providing it with two separate processing zones, the apparatus has many different uses. For instance, a starting material in the form of a powder can be fed into the inner processing zone. As an annular movement is imparted to the powder particles by the rotation of the rotary disk, the powder particles can be built up into granules by spraying them with a granulating liquid. This granulating operation would be performed while the gap between the disk and the dividing wall is closed. Subsequently, the gap can be opened to permit the completed granules to be dried in the outer processing zone. Extruded or otherwise arbitrarily formed particles can also be formed into circle-shaped granules in the inner processing zone. Such a shaping operation usually requires a spraying step, which would be most effectively carried out while the gap between the wall and the rotary disk is closed. If a subsequent drying operation is required, the gap would be opened to permit such a drying operation to be carried out in the outer processing zone. In connection with a coating operation, the coating liquid sprayed onto the granules in the inner processing zone would be dried in the outer processing zone after the coated granules are transferred from the inner processing zone to the outer processing zone through the gap formed between the disk and the wall.

Because the different processes are carried out in separate processing zones, the processes do not interfere with each other. For instance, the airstream flowing through the outer processing zone does not interfere with the annular movement of the granules in the inner processing chamber or with the liquid being sprayed in the inner processing chamber. Thus, the volume of air can be quite large resulting in a large heat exchanging surface, whereby the agglomerating and coating liquids can be sprayed at a high rate and dried quickly to thereby reduce the overall processing period.

By varying the size of the gap between the disk and the wall, the rate at which the granules are transported from the inner processing zone to the outer processing zone can be regulated. Such a pneumatic transport system also inhibits any undesired conglutination of the granules.

BRIEF DESCRIPTION OF THE DRAWINGS

For a more complete understanding of the present invention, reference is made to the following detailed description of three exemplary embodiments considered in conjunction with the accompanying drawings, in which.

DESCRIPTION OF THE EXEMPLARY EMBODIMENTS

Figure 1:
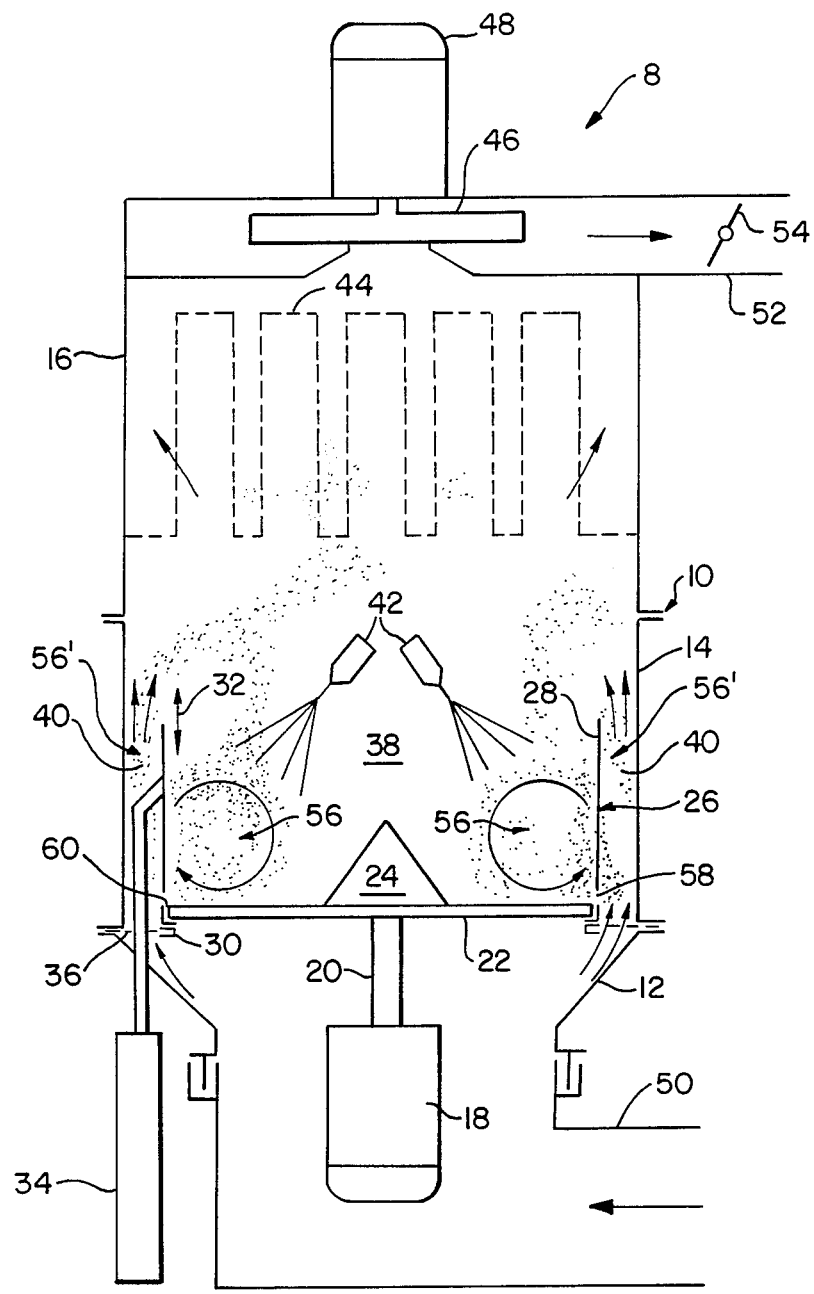
FIG. 1 is a schematic illustration of a first exemplary embodiment of an apparatus constructed in accordance with the present invention.
Figure 2:
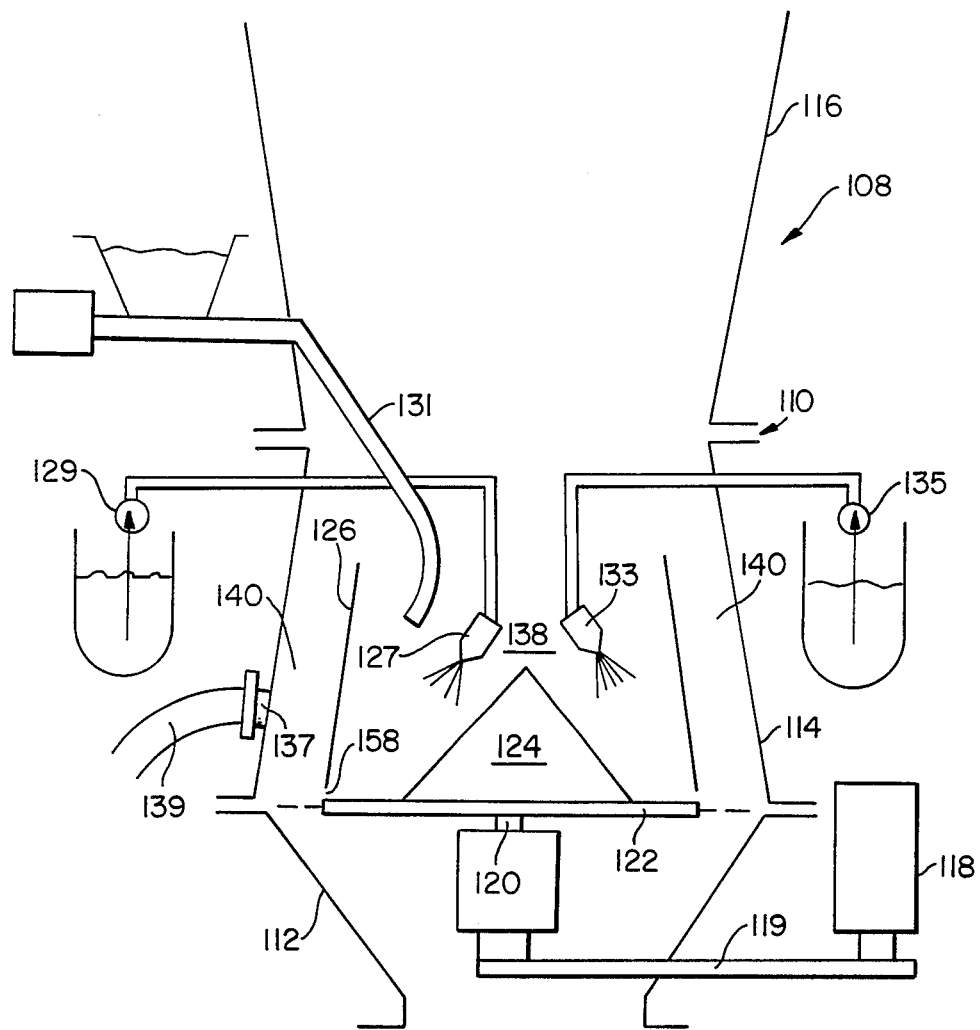
FIG. 2 is a schematic illustration of a second exemplary embodiment of an apparatus constructed in accordance with the present invention.
Figure 3:
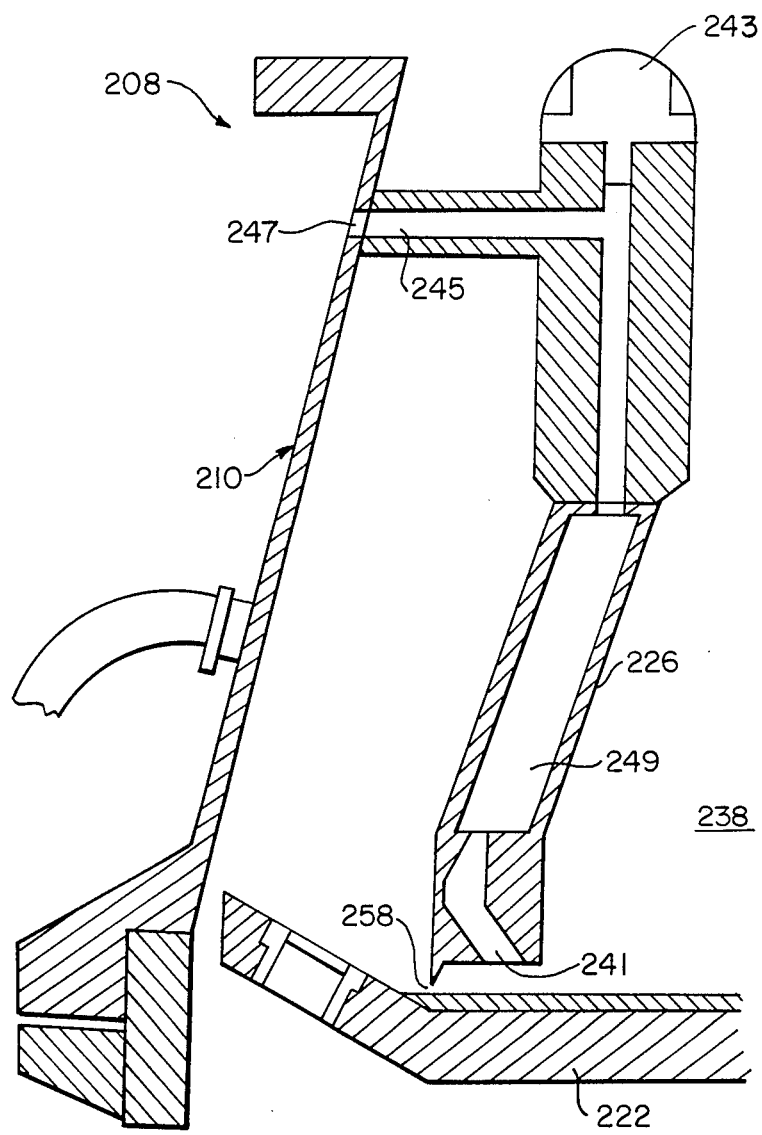
FIG. 3 is a schematic illustration of a portion of a third exemplary embodiment of an apparatus constructed in accordance with the present invention.

With reference to FIG. 1, a fluid-bed, rotary-disk apparatus 8 has a housing 10 which includes a lower section 12, a middle section 14 and an upper section 16.

The lower section 12 of the housing 10 contains a motor 18 having a rotatable output shaft 20. A rotor disk 22 is attached to the output shaft 20 for conjoint rotation therewith. A cone 24 extends upwardly from the middle of the rotor disk 22.

The middle section 14 of the housing 10 contains a generally cylindrical, non-rotatable wall 26 having an upper part 28 and a lower part 30. The upper part 28 of the wall 26 is mounted for reciprocating movement in a vertical direction indicated by arrow 32, whereby the upper part 28 of the wall 26 is movable toward and away from the lower part 30 of the wall 26. The vertical movement of the upper part 28 of the wall 26 is achieved by pneumatic cylinders 34 (only one of which is shown in FIG. 1). The lower part 30 of the wall 26 surrounds the rotor disk 22. An annular plate 36, which is permeable to air, extends between the housing 10 and the lower part 30 of the wall 26.

The interior of the upper part 28 of the wall 26 defines a processing area 38. The upper part 28 of the wall 26 and the middle section 14 of the housing 10 cooperate to define a processing area 40. Spray nozzles 42 are mounted within the processing area 38.

The upper section 16 of the housing 10 contains a filter 44. A fan 46, which is driven by a motor 48, is mounted above the filter 44. The fan 46 causes air to flow from an intake duct 50, which communicates with the lower section 12 of the housing 10, to an exhaust duct 52, which communicates with the upper section 16 of the housing 10. A flap 54 in the exhaust duct 52 controls the flow of air. Alternatively, the fan 46 could be located in the intake duct 50, rather than in the exhaust duct 52.

In operation, the processing area 38 is filled with particles 56 to be processed. Before, after or during such a filling step, the rotor disk 22 is rotated. The centrifugal forces generated as a result of the rotational movement of the rotor disk 22 cause the particles 56 to be pressed against the upper part 28 of the wall 26. The rotational movement of the rotor disk 22 and the centrifugal forces resulting therefrom cause the particles 56 to assume an annular movement. From a three-dimensional standpoint, the particles 56 move within a torus in a roping manner and thereby assume a wreath-like shape.

Because the centrifugal forces are smallest at the middle of the rotor disk 22, there is the possibility that some of the particles 56 will remain at the middle of the rotor disk 22 during its rotation. The cone 24 promotes the movement of the particles 56 away from the center of the rotor disk 22, whereby all of the particles 56 may be properly processed. The shape of the cone 24 can be varied depending upon the particular processing parameters. Rather than providing the rotor disk 22 with the centrally-located cone 24, the entire rotor disk 22 can be cone-shaped. In order to promote the annular movement of the particles 56, the cone 24 can be provided with a concave surface.

The annular movement and hence the proper mixing of the particles 56 are not disturbed by the air flowing through the housing 10, because the majority of such air passes through the processing area 40, rather than through the processing area 38 in which the particles 56 are undergoing their annular movement. Because there is no substantial "air cushion" in the processing area 38, the particles 56 impact against the upper part 28 of the wall 26 with full force, resulting in the production of granules which are more compact and which have a higher bulk density than granules produced in accordance with the prior art described above. In this regard, the centrifugal forces acting on the particles 56 can be adjusted, if desired, by varying the rotational velocity of the output shaft 20 of the motor 18. Such forces can also be influenced by varying the surface characteristics of the rotor disk 22. For instance, the surface of the rotor disk 22 can be coated with Teflon or it can be roughened or otherwise provided with cavities or projections.

When processing sticky materials, scrapers or cams can be provided for the purpose of removing any of the particles 56 which adhere to the upper part 28 of the wall 26 during the processing operation. Also, the upper part 28 of the wall 26 can be coated with a material, such as Teflon, which inhibits the adhesion of the particles 56.

The upper part 28 of the wall 26 has a height which is slightly higher than the height that the particles 56 reach during their annular movement. The lower part 30 of the wall 26 extends to the height of the upper edge of the rotor disk 22.

By moving the upper part 28 of the wall 26 upwardly out of sealing relationship with the lower part 30 of the wall 26, a ring-like gap 58 is formed between the upper part 28 of the wall 26 and the lower part 30 of the wall 26. The size of the gap 58 can be varied by adjusting the height of the upper part 28 of the wall 26. The gap 58 permits the controlled partial flow of the particles 56 from the processing area 38 to the processing area 40.

The particles 56' present in the processing area 40 are fluidized by the air passing through the plate 36 from the lower section 12 of the housing 10. The air dries the particles 56', such drying being facilitated by the fact that the particles 56' are fluidized so as to permit them to be more completely exposed to the airstream, the intensity of which can be varied over a wide range. Because such a drying operation is carried out in the processing area 40, which is separated from the processing area 38 by the upper part 28 of the wall 26, the drying operation does not interfere with the annular movement of the particles 56 in the processing area 38. The particles 56' eventually flow over the upper part 28 of the wall 26 and fall back into the processing area 38.

Some of the air flowing upwardly from the lower section 12 of the housing 10 passes through a circular gap 60 formed between the rotor disk 22 and the lower part 30 of the wall 26. The gap 60 is small enough to prevent the particles 56 from falling down into the lower section 12 of the housing 10. Although the gap 60 is, on the one hand, large enough to permit enough air to flow therethrough so as to prevent particle dust from falling into the lower section 12 of the housing 10, it is, on the other hand, small enough to prevent the air flowing therethrough from interfering with the annular movement of the particles 56 in the processing area 38. If the gap 60 is very narrow, the lower part 30 of the wall 26 can be provided with a coating of a friction-reducing material, such as Teflon.

Although the processing areas 38, 40 are shown in FIG. 1 as being at the same elevation, the processing area 40 can be arranged at a higher or lower elevation than the processing area 38 and can be maintained at a different, perhaps higher, temperature than that of the processing area 38. Regardless of its location relative to the processing area 38, the processing area 40 can be enlarged so as to regulate its drying capacity. One way to enlarge the size of the processing area 40 would be to make the middle section 14 of the housing 10 from a folding wall.

The spray nozzles 42 provided in the processing area 38 can be used to perform a coating operation on the particles 56. Because the intensity of the airstream passing through the processing area 38 is so low, neither the annular movement of the particles 56 nor the liquid sprays discharged from the nozzles 42 are disturbed, whereby an extraordinarily regular spray-coating can be achieved without incurring substantial atomizing losses. In the processing area 40, the particles 56' are continuously dried and therefore prepared for further spraying. The substantial drying capacity of the processing area 40 results in relatively short drying times and relatively high spraying rates. To achieve optimal drying, the intensity of the airstream flowing through the processing area 40 can be varied over a wide range.

Two other exemplary embodiments of fluid-bed, rotary-disk apparatus constructed in accordance with the present invention are illustrated in FIGS. 2 and 3. Elements illustrated in FIGS. 2 and 3 which correspond to the elements described above with respect to FIG. 1 have been designated by corresponding reference numerals increased by one-hundred and two-hundred, respectively. The embodiments of FIGS. 2 and 3 operate in the same manner as the embodiment of FIG. 1 unless otherwise stated.

With reference to FIG. 2, a fluid-bed, rotary-disk apparatus 108 has a housing 110 which includes a lower section 112, a middle section 114 and an upper section 116.

The lower section 112 of the housing 110 contains a rotatable shaft 120 which is driven by a motor 118 through a belt 119, the motor 118 being located externally of the housing 110. A rotor disk 122 is attached to the shaft 122 for conjoint rotation therewith. A cone 124 extends upwardly from the middle of the rotor disk 122. The rotor disk 122 has a perimeter portion 124 which is perforated or otherwise rendered air permeable.

The middle section 114 of the housing 110 contains a tapered wall 126 which separates an inner processing area 138 from an outer processing area 140. A ring-like gap 158 is formed between the wall 126 and the rotor disk 122. The size of the gap 158 can be varied by moving the wall 126 and/or the rotor disk 122 up and down.

In operation, with the gap 158 closed, the inner processing area 138 is filled with dry particles. Upon the rotation of the rotor disk 122, the particles (not shown) assume an annular movement. A finely atomized granulating liquid is sprayed onto the particles by a nozzle 127 which is supplied with the granulating liquid by a pump 129. The granulating liquid forms the particles into agglomerates which develop successively into granulates. Sometimes, before spraying the particles with the granulating liquid, they must be wetted by, for instance, an ultrasonic atomizer (not shown) or a steam nozzle (not shown). If the processing operation requires the feeding of a powdery substance, a dosing device 131 can be provided. In the event that several different powdery substances are required, several individual dosing devices would be provided.

By slightly lowering the rotor disk 122 and/or raising the wall 126, some of the particles are transferred from the inner processing area 138 to the outer processing area 140 through the resulting gap 158. The amount of the particles transferred from the inner processing area 138 to the outer processing area 140 can be controlled by varying the size of the gap 158. The particles in the outer processing area 140 are fluidized and then transferred back to the inner processing area 138. Thus, the airstream performs two functions: the drying of the particles and the pneumatic transport of the particles.

The apparatus 108 can also be used to perform a coating operation. In connection with the performance of a coating operation, a finely atomized coating liquid is sprayed onto the particles contained in the inner processing area 138 by a nozzle 133 which is supplied with the coating liquid by a pump 135. During such a coating operation, the particles are transferred from the inner processing area 138 to the outer processing area 140 through the gap 158. In the outer processing area 140, the particles are dried and then returned to the inner processing area 138.

For the purpose of discharging the end product, the airflow through the housing 110 is terminated. The gap 158 and a slide gate 137 are then opened to permit the particles to be conveyed into a discharge duct 139 as the rotor disk 122 continues to rotate.

Referring now to FIG. 3, a fluid-bed, rotary disk apparatus 208 is provided with a sealing arrangement adapted to seal a gap 258 formed between a rotor disk 222 and a wall 226. More particularly, the sealing arrangement includes an annular slit 241 formed in the bottom of the wall 226. A blower 243 draws air into a channel 245 through a port 247 provided in a housing 210 and then conveys the air to the slit 241 through a duct 249 formed in the wall 226. The slit 241 is arranged such that the air discharged therefrom is directed against the rotor disk 222 at an inclined angle. The intensity of the air discharged from the slit 241 is high enough to prevent the passage of particles through the gap 258, yet is low enough so as not to interfere with the annular movement of the particles in an inner processing area 238.

It will be understood that the embodiments described herein are merely exemplary and that a person skilled in the art could make many variations and modifications without departing from the spirit and scope of the invention. All such modifications and variations are intended to be included within the scope of the invention as defined in the appended claims.

I claim:

1. Apparatus for producing and/or processing granules, comprising a housing having an interior, a rotatable disk positioned in said interior of said housing, dividing means located in said housing above said disk for dividing said interior into an inner processing zone and an outer processing zone which surrounds said inner processing zone, and connecting means for selectively connecting and disconnecting said inner and outer processing zones to and from each other, whereby when said inner and outer processing zones are connected to each other granules can be conveyed from said inner processing zone to said outer processing zone as a result of the rotation of said disk.

2. Apparatus according to claim 1, wherein said connecting means includes moving means for creating the relative movement of at least a portion of said dividing means, whereby a gap is formed in said dividing means or between said dividing means and said disk for the purpose of permitting granules to be conveyed from said inner processing zone to said outer processing zone.

3. Apparatus according to claim 2, further comprising means for generating an upward flowing airstream through said interior of said housing and permitting means for permitting at least a major portion of said airstream to flow into said outer processing zone, whereby granules conveyed to said outer processing zone from said inner processing zone can be fluidized by said at least a major portion of said airstream and reconveyed to said inner processing zone.

4. Apparatus according to claim 3, wherein said dividing means includes a closed wall.

5. Apparatus according to claim 4, wherein said wall has a generally cylindrical shape, whereby said inner processing zone has a generally cylindrical shape and said outer processing zone has a generally annular shape.

6. Apparatus according to claim 4, wherein said wall has a tapered shape.

7. Apparatus according to claim 4, wherein said permitting means includes a stationary lower part of said wall which extends around said disk and a stationary member which extends between said lower part of said wall and said housing, said stationary member being permeable to air.

8. Apparatus according to claim 7, wherein said wall includes an upper part which is movable toward and away from said lower part to thereby close and open said gap.

9. Apparatus according to claim 4, wherein said permitting means includes a perimeter portion of said disk, said perimeter portion being permeable to air.

10. Apparatus according to claim 9, wherein said perimeter portion of said disk is arranged at an upward angle relative to the horizontal.

11. Apparatus according to claim 9, wherein said wall is movable toward and away from said disk to thereby close and open said gap.

12. Apparatus according to claim 9, wherein said disk is movable toward and away from said wall to thereby close and open said gap.

13. Apparatus according to claim 9, wherein said wall is movable toward and away from said disk and said disk is movable toward and away from said wall to thereby close and open said gap.

14. Apparatus according to claim 4, wherein said wall includes sealing means for forming a seal between said wall and said disk, said sealing means including an annular slit in a lower end of said wall, a passageway formed in said wall and communicating with said slit, and supplying means carried by said wall for supplying air to said slit through said passageway, the intensity of the air exiting said slit being sufficient to form an air seal between said lower end of said wall and said disk.

15. Apparatus according to claim 14, wherein said slit is angled such that the air exiting therefrom is directed toward said inner processing zone.

16. Apparatus according to claim 1, further comprising spraying means for spraying a liquid on granules contained in said inner processing zone.

17. Apparatus according to claim 16, wherein said liquid is a granulating liquid.

18. Apparatus according to claim 16, wherein said liquid is a coating liquid.

19. Apparatus according to claim 1, further comprising supplying means for supplying powder to said inner processing zone.

20. Apparatus according to claim 1, wherein said disk includes a centrally located cone having a tip which extends upwardly from said disk.

21. Apparatus according to Claim 1, wherein said inner and outer processing zones are connected along substantially the entire periphery of said inner processing zone.

22. Apparatus according to claim 1, wherein said inner processing zone has a generally cylindrical shape and said outer processing zone has a generally annular shape.

23. A method for producing and/or processing granules in an apparatus which includes a housing having an interior and a rotatable disk positioned in said interior of said housing, said method comprising the steps of dividing said interior of said housing above said disk into an inner processing zone and an outer processing zone which surrounds said inner processing zone and selectively connecting and disconnecting said inner and outer processing zones to and from each other, whereby when said inner and outer processing zones are connected to each other granules can be conveyed from said inner processing zone to said outer processing zone as a result of the rotation of said disk.

24. A method according to claim 23, wherein said inner and outer processing zones are connected to and disconnected from each other by causing the relative movement of at least a portion of said dividing means, whereby a gap is formed in said dividing means or between said dividing means and said disk for the purpose of permitting granules to be conveyed from said inner processing zone to said outer processing zone.

25. A method according to claim 24, further comprising the steps of generating an upward flowing airstream through said interior of said housing, at least a major portion of said airstream flowing into said outer processing zone, whereby granules conveyed to said outer processing zone from said inner processing zone are fluidized by said at least a major portion of said airstream and reconveyed to said inner processing zone.

26. A method according to claim 25, wherein said dividing means includes a closed wall.

27. A method according to claim 26, wherein said wall has a generally cylindrical shape, whereby said inner processing zone has a generally cylindrical shape and said outer processing zone has a generally annular shape.

28. A method according to claim 27, wherein said wall is movable toward and away from said disk to thereby close and open said gap.

29. A method according to claim 27, wherein said disk is movable toward and away from said wall to thereby close and open said gap.

30. A method according to claim 27, wherein said wall is movable toward and away from said disk and said disk is movable toward and away from said wall to thereby close and open said gap.

31. A method according to claim 27, further comprising the step of discharging air from an annular slit provided in a lower end of said wall, the intensity of the air discharged from said slit being sufficient to form an air seal between said lower end of said wall and said disk.

32. A method according to claim 31, wherein said slit is angled such that the air discharged therefrom is directed toward said inner processing zone.

33. A method according to claim 27, wherein an upper part of said wall is movable toward and away from a lower part of said wall which is fixedly positioned about said disk, whereby the movement of said upper part toward and away from said lower part closes and opens said gap.

34. A method according to claim 23, further comprising the step of spraying a liquid on granules contained in said inner processing zone.

35. A method according to claim 34, wherein said liquid is a granulating liquid.

36. A method according to claim 34, wherein said liquid is a coating liquid.

37. A method according to claim 23, further comprising the step of supplying powder to said inner processing zone.

38. A method according to claim 23, wherein said inner and outer processing zones are connected along substantially the entire periphery of said inner processing zone.

39. A method according to claim 23, wherein said inner processing zone has a generally cylindrical shape and said outer processing zone has a generally annular shape.

40. Apparatus for producing and/or processing granules, comprising a housing having an interior; a rotatable disk positioned in said interior of said housing; dividing means located in said housing above said disk for dividing said interior into an inner processing zone and an outer processing zone; connecting means for selectively connecting and disconnecting said inner and outer processing zones to and from each other whereby when said inner and outer processing zones are connected to each other granules can be conveyed from said inner processing zone to said outer processing zone as a result of the rotation of said disk, said connecting means including moving means for creating the relative movement of at least a portion of said dividing means, whereby a gap is formed in said dividing means or between said dividing means and said disk for the purpose of permitting granules to be conveyed from said inner processing zone to said outer processing zone; generating means for generating an upward flowing airstream through said interior of said housing; and permitting means for permitting at least a major portion of said airstream to flow into said outer processing zone, whereby granules conveyed to said outer processing zone from said inner processing zone can be fluidized by said at least a major portion of said airstream and reconveyed to said inner processing zone.

41. Apparatus according to claim 40, wherein said dividing means includes a closed wall.

42. Apparatus according to claim 41, wherein said wall has a generally cylindrical shape, whereby said inner processing zone has a generally cylindrical shape and said outer processing zone has a generally annular shape.

43. Apparatus according to claim 41, wherein said wall has a tapered shape.

44. Apparatus according to claim 41, wherein said permitting means includes a stationary lower part of said wall which extends around said disk and a stationary member which extends between said lower part of said wall and said housing, said stationary member being permeable to air.

45. Apparatus according to claim 44, wherein said wall includes an upper part which is movable toward and away from said lower part to thereby close and open said gap.

46. Apparatus according to claim 41, wherein said permitting means includes a perimeter portion of said disk, said perimeter portion being permeable to air.

47. Apparatus according to claim 46, wherein said perimeter portion of said disk is arranged at an upward angle relative to the horizontal.

48. Apparatus according to claim 46, wherein said wall is movable toward and away from said disk to thereby close and open said gap.

49. Apparatus according to claim 46, wherein said disk is movable toward and away from said wall to thereby close and open said gap.

50. Apparatus according to claim 46, wherein said wall is movable toward and away from said disk and said disk is movable toward and away from said wall to thereby close and open said gap.

51. Apparatus according to claim 41, wherein said wall includes sealing means for forming a seal between said wall and said disk, said sealing means including an annular slit in a lower end of said wall, a passageway formed in said wall and communicating with said slit, and supplying means carried by said wall for supplying air to said slit through said passageway, the intensity of the air exiting said slit being sufficient to form an air seal between said lower end of said wall and said disk.

52. Apparatus according to claim 51, wherein said slit is angled such that the air exiting therefrom is directed toward said inner processing zone.

53. Apparatus according to claim 40, further comprising spraying means for spraying a liquid on granules contained in said inner processing zone.

54. Apparatus according to claim 53, wherein said liquid is a granulating liquid.

55. Apparatus according to claim 53, wherein said liquid is a coating liquid.

56. Apparatus according to claim 40, further comprising supplying means for supplying powder to said inner processing zone.

57. Apparatus according to claim 40, wherein said disk includes a centrally located cone having a tip which extends upwardly from said disk.

58. A method for producing and/or processing granules in an apparatus which includes a housing having an interior and a rotatable disk positioned in said interior of said housing, said method comprising the steps of dividing said interior of said housing above said disk into an inner processing zone and an outer processing zone, selectively connecting and disconnecting said inner and outer processing zones to and from each other, whereby when said inner and outer processing zones are connected to each other granules can be conveyed from said inner processing zone to said outer processing zone as a result of the rotation of said disk, said inner and outer processing zones being connected to and disconnected from each other by causing the relative movement of at least a portion of said dividing means, whereby a gap is formed in said dividing means or between said dividing means and said disk for the purpose of permitting granules to be conveyed from said inner processing zone to said outer processing zone, and generating an upward flowing airstream through said interior of said housing, at least a major portion of said airstream flowing into said outer processing zone, whereby granules conveyed to said outer processing zone from said inner processing zone are fluidized by said at least a major portion of said airstream and reconveyed to said inner processing zone.

59. A method according to claim 58, wherein said dividing means includes a closed wall.

60. A method according to claim 59, wherein said wall has a generally cylindrical shape, whereby said inner processing zone has a generally cylindrical shape and said outer processing zone has a generally annular shape.

61. A method according to claim 60, wherein said wall is movable toward and away from said disk to thereby close and open said gap.

62. A method according to claim 60, wherein said disk is movable toward and away from said wall to thereby close and open said gap.

63. A method according to claim 60, wherein said wall is movable toward and away from said disk and said disk is movable toward and away from said wall to thereby close and open said gap.

64. A method according to claim 60, further comprising the step of discharging air from an annular slit provided in a lower end of said wall, the intensity of the air discharged from said slit being sufficient to form an air seal between said lower end of said wall and said disk.

65. A method according to claim 64, wherein said slit is angled such that the air discharged therefrom is directed toward said inner processing zone.

66. A method according to claim 60, wherein an upper part of said wall is movable toward and away from a lower part of said wall which is fixedly positioned about said disk, whereby the movement of said upper part toward and away from said lower part closes and opens said gap.

67. A method according to claim 58, further comprising the step of spraying a liquid on granules contained in said inner processing zone.

68. A method according to claim 67, wherein said liquid is a granulating liquid.

69. A method according to claim 67, wherein said liquid is a coating liquid.

70. A method according to claim 58, further comprising the step of supplying powder to said inner processing zone.

* * * * *